US009027338B2

(12) United States Patent
Narita et al.

(10) Patent No.: US 9,027,338 B2
(45) Date of Patent: May 12, 2015

(54) FLUID PRESSURE PUMP MOTOR

(71) Applicant: Kayaba Industry Co., Ltd., Minato-ku, Tokyo (JP)

(72) Inventors: Susumu Narita, Kanagawa (JP); Junichiro Sugimoto, Kanagawa (JP); Yuki Sakai, Kanagawa (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 14/376,433

(22) PCT Filed: Mar. 19, 2013

(86) PCT No.: PCT/JP2013/057767

§ 371 (c)(1),
(2) Date: Aug. 4, 2014

(87) PCT Pub. No.: WO2013/146450

PCT Pub. Date: Oct. 3, 2013

(65) Prior Publication Data

US 2015/0040551 A1 Feb. 12, 2015

(30) Foreign Application Priority Data

Mar. 26, 2012 (JP) ................................ 2012-069018

(51) Int. Cl.
*F16D 31/02* (2006.01)
*F15B 11/024* (2006.01)
*F15B 13/04* (2006.01)

(52) U.S. Cl.
CPC ........... *F15B 11/024* (2013.01); *F15B 13/0401* (2013.01); *F15B 2211/20515* (2013.01); *F15B 2211/31529* (2013.01); *F15B 2211/275* (2013.01)

(58) Field of Classification Search
USPC .................................. 60/414, 419, 487, 489
See application file for complete search history.

(56) References Cited

U.S. PATENT DOCUMENTS 7,249,457 B2 * 7/2007 Raszga et al. .................. 60/419
8,186,154 B2 * 5/2012 Nelson et al. .................. 60/414

(Continued)

FOREIGN PATENT DOCUMENTS

| | | | |
|---|---|---|---|
| JP | 5168856 | U | 5/1976 |
| JP | 6412080 | A | 1/1989 |
| JP | 200248215 | A | 2/2002 |
| JP | 2007-327527 | A | 12/2007 |
| JP | 2011127569 | A | 6/2011 |

OTHER PUBLICATIONS

International Search Report dated Jun. 18, 2013, corresponds to PCT/JP2013/057767.

(Continued)

*Primary Examiner* — Michael Leslie
(74) *Attorney, Agent, or Firm* — Lowe Hauptman & Ham, LLP

(57) ABSTRACT

A fluid pressure pump motor includes a supply/discharge passage where both a hydraulic fluid pumped in to a fluid pressure pump and a hydraulic fluid discharged from the fluid pressure motor flow, and a variable valve provided in the supply/discharge passage to control the fluid path area of the supply/discharge passage. The variable valve reduces the fluid path area of the supply/discharge passage for simultaneously actuating the fluid pressure pump and the fluid pressure motor to be smaller than the fluid path area for actuating only one of the fluid pressure pump and the fluid pressure motor.

9 Claims, 11 Drawing Sheets

(56) References Cited

U.S. PATENT DOCUMENTS

| | | | |
|---|---|---|---|
| 2002/0020289 | A1 | 2/2002 | Saito et al. |
| 2005/0036894 | A1 | 2/2005 | Oguri |
| 2010/0083822 | A1 | 4/2010 | Shimizu |
| 2010/0107620 | A1 | 5/2010 | Nelson et al. |

OTHER PUBLICATIONS

Written Opinion dated Jun. 18, 2013, corresponds to PCT/JP2013/057787.

Extended European Search Report issued Mar. 9, 2015, corresponding to European patent application No. 13769394.1.

* cited by examiner

FLUID PRESSURE PUMP MOTOR

TECHNICAL FIELD

The present invention relates to a fluid pressure pump motor having a fluid pressure pump that supplies a hydraulic fluid to a fluid pressure actuator and a fluid pressure motor rotationally driven by a hydraulic fluid reflowing from the fluid pressure actuator.

BACKGROUND ART

In the related art, there is known a hybrid type construction machine in the field of construction machinery such as a power shovel. In the hybrid type construction machine, electric power is generated by rotating an electric generator using extra output power of an engine or discharge energy of an actuator, the electric power generated by the electric generator is accumulated, and actuation of an actuator is assisted using accumulated electric power. In such a hybrid type construction machine, a fluid pressure pump motor is used. The fluid pressure pump motor includes an assist pump rotationally driven by an electric motor to pump out the hydraulic fluid to assist a main pump to actuate the actuator, and a regenerative motor rotated by the hydraulic fluid reflowing from the actuator to rotationally drive the electric motor.

In JP 2011-127569A, there is disclosed an assist regeneration device including a motor/generator rotationally actuated by electric energy and a regenerative motor that rotationally drives the motor/generator using energy of a hydraulic fluid, and an assist pump rotationally driven by the motor/generator to pump out the hydraulic fluid.

SUMMARY OF INVENTION

However, when such a fluid pressure pump motor is used in the assist regeneration device as disclosed in JP 2011-127569A, a fluid path for guiding the hydraulic fluid pumped in to the assist pump from a reservoir and a fluid path for guiding the hydraulic fluid discharged from the regenerative motor to the reservoir are provided as a common supply/discharge passage. In this case, when assistance and regeneration are simultaneously performed, for example, when actuation is assisted by one actuator while regeneration is performed by another actuator, the hydraulic fluid is pumped in to the assist pump from the supply/discharge passage while the hydraulic fluid is discharged from the regenerative motor to the supply/discharge passage. For this reason, a flow of the hydraulic fluid pumped in to the assist pump is hindered by a flow of the hydraulic fluid discharged from the regenerative motor. Therefore, a sufficient amount of the hydraulic fluid may not be supplied from the supply/discharge passage to the assist pump.

In view of the aforementioned problems, it is therefore an object of this invention to provide a fluid pressure pump motor capable of stably providing the hydraulic fluid from the supply/discharge passage to the fluid pressure pump even when the fluid pressure pump and the fluid pressure motor are simultaneously actuated.

According to one aspect of this invention, a fluid pressure pump motor includes: a fluid pressure pump that is configured to supply a hydraulic fluid to a fluid pressure actuator, a fluid pressure motor that is configured to be rotationally driven by the hydraulic fluid reflowing from the fluid pressure actuator, a supply/discharge passage where both a hydraulic fluid pumped in to the fluid pressure pump and a hydraulic fluid discharged from the fluid pressure motor flow, and a variable valve provided in the supply/discharge passage and capable of controlling a fluid path area of the supply/discharge passage. The variable valve reduces the fluid path area of the supply/discharge passage for simultaneously actuating the fluid pressure pump and the fluid pressure motor to be smaller than the fluid path area for actuating only one of the fluid pressure pump and the fluid pressure motor.

The details as well as other features and advantages of this invention are set forth in the remainder of the specification and are shown in the accompanying drawings.

DESCRIPTION OF EMBODIMENTS

Figure 1:
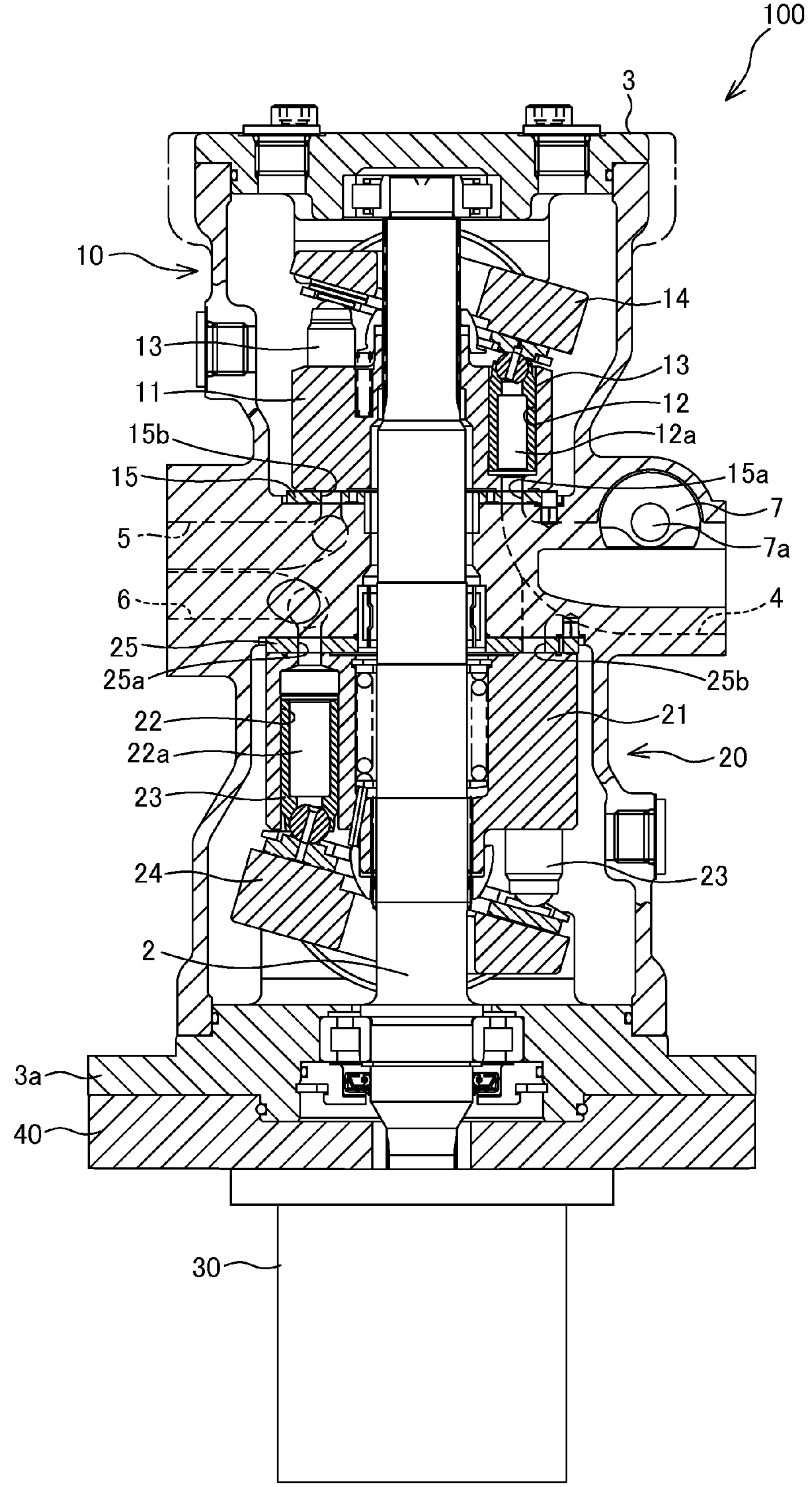
FIG. 1 is a front cross-sectional view illustrating a fluid pressure pump motor according to a first embodiment of the invention.

Hereinafter, embodiments of the present invention will be described with reference to the accompanying drawings.

First Embodiment

Hereinafter, a hydraulic pump motor 100 as a fluid pressure pump motor according to a first embodiment of the invention will be described with reference to FIGS. 1 to 3B. In the hydraulic pump motor 100, hydraulic oil is employed as a hydraulic fluid. Instead of the hydraulic oil, other fluids such as hydraulic water may also be employed as the hydraulic fluid.

First, a configuration of the hydraulic pump motor 100 will be described.

The hydraulic pump motor 100 supplies hydraulic oil to a hydraulic actuator (not illustrated) as a fluid pressure actuator to drive the hydraulic actuator. The hydraulic pump motor 100 is employed in a hybrid type construction machine such as a power shovel in which the hydraulic actuator is driven using the hydraulic oil pumped out from a main hydraulic pump (not illustrated) driven by a motor.

The hydraulic pump motor 100 includes a hydraulic pump 10 as a fluid pressure pump that supplies the hydraulic oil to the hydraulic actuator, a hydraulic motor 20 as a fluid pressure motor rotationally driven by the hydraulic oil reflowing from the hydraulic actuator, and an electric motor 30 arranged side by side in series with the hydraulic pump 10 and the hydraulic motor 20.

The hydraulic pump 10 and the hydraulic motor 20 are a cam plate type variable capacity piston pump motor. The hydraulic motor 20 is a piston pump motor having a size larger than that of the hydraulic pump 10.

The hydraulic pump motor 100 includes a casing 3 that houses the hydraulic pump 10 and the hydraulic motor 20 and a single rotational shaft 2 rotatably supported by the casing 3 and commonly used by the hydraulic pump 10 and the hydraulic motor 20.

The casing 3 has a flange portion 3*a* bolted to a plate 40. The casing 3 is connected to the electric motor 30 by interposing the flange portion 3*a* and the plate 40. In this case, a decelerator may be provided between the rotational shaft 2 of the hydraulic pump motor 100 and the rotational shaft of the electric motor.

The casing 3 includes a supply/discharge passage 4 where both the hydraulic oil pumped in to the hydraulic pump 10 and the hydraulic oil discharged from the hydraulic motor 20 flow, a pump-out passage 5 where the hydraulic oil pumped out from the hydraulic pump 10 flows, a return passage 6 where the hydraulic oil returning from the hydraulic actuator and supplied to the hydraulic motor 20 flows, and a variable valve 7 provided in the supply/discharge passage 4 and capable of controlling a fluid path area of the supply/discharge passage 4.

The supply/discharge passage 4 communicates with a reservoir (not illustrated) where the hydraulic oil is accumulated. The pump-out passage 5 and the return passage 6 communicate with the hydraulic actuator. The supply/discharge passage 4 is provided oppositely to the pump-out passage 5 and the return passage 6.

The variable valve 7 is a rotary valve driven by a rotational actuator (not illustrated) rotatably with respect to a rotational shaft 7*a*. The rotational shaft 7*a* is rotatably supported by the casing 3. A rotational angle of the variable valve 7 can be controlled between 0° and 90° in a stepless manner by virtue of rotation of the rotational shaft 7*a*.

Figure 2A:
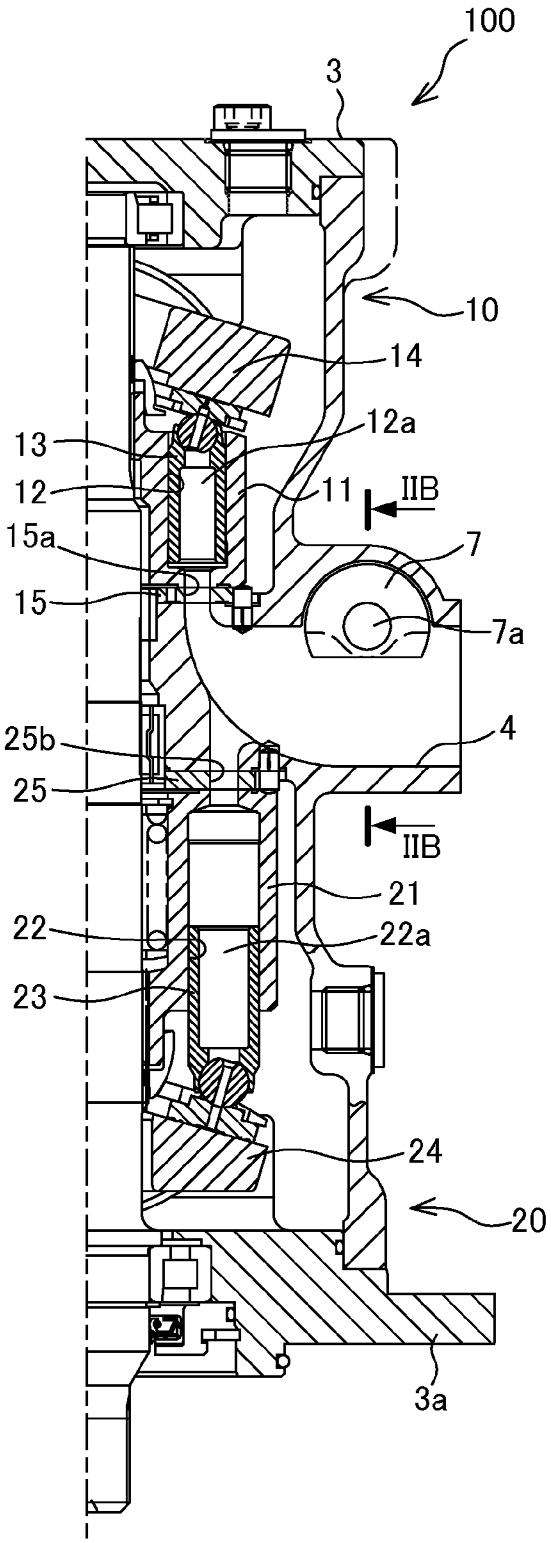
FIG. 2A is a diagram illustrating an effect of a variable valve when a fluid path area is maximized.
Figure 2B:
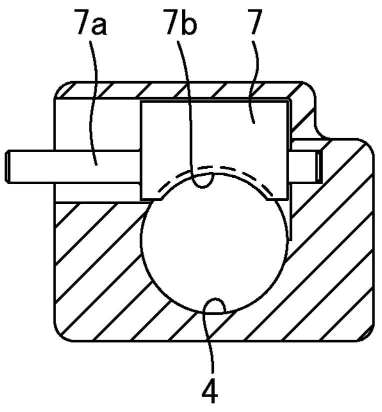
FIG. 2B is a cross-sectional view taken along a line IIB-IIB of FIG. 2A.

When the rotational angle is set to 0° (as illustrated in FIGS. 2A and 2B), the variable valve 7 is buried in a wall surface of the supply/discharge passage 4 to maximize the fluid path area of the supply/discharge passage 4. As the variable valve 7 is pivoted with respect to the rotational shaft 7*a*, the variable valve 7 protrudes toward the inside of the supply/discharge passage 4 and reduces the fluid path area of the supply/discharge passage 4. When the rotational angle is set to 90° (in the state illustrated in FIGS. 3A and 3B), the variable valve 7 minimizes the fluid path area of the supply/discharge passage 4.

When only one of the hydraulic pump 10 and the hydraulic motor 20 is actuated, the variable valve 7 maximizes the fluid path area of the supply/discharge passage 4. When the hydraulic pump 10 and the hydraulic motor 20 are simultaneously actuated, the variable valve 7 reduces the fluid path area of the supply/discharge passage 4. In this manner, the variable valve 7 reduces the fluid path area of the supply/discharge passage 4 for simultaneously actuating the hydraulic pump 10 and the hydraulic motor 20 to be smaller than the fluid path area for actuating only one of the hydraulic pump 10 and the hydraulic motor 20.

The variable valve 7 is formed in a cylindrical shape having a D-shaped cross section obtained by notching a part of the cylinder. The variable valve 7 has a concave portion 7*b* (refer to FIG. 2B) that forms an inner circumferential surface approximately coplanar with the inner circumferential shape of the supply/discharge passage 4 when the rotational angle is set to 0°.

The variable valve 7 reduces the fluid path area of the supply/discharge passage 4 to approximately a half when the rotational angle is set to 90°. In this manner, the variable valve 7 is formed such that the hydraulic oil can flow through the supply/discharge passage 4 even when the fluid path area of the supply/discharge passage 4 is minimized. Therefore, since the supply/discharge passage 4 is not completely blocked, it is possible to guide extra hydraulic oil to the reservoir when the hydraulic oil discharged from the hydraulic motor 20 is more than the hydraulic oil pumped in to the hydraulic pump 10.

The hydraulic pump 10 and the hydraulic motor 20 are arranged oppositely in an axial direction of the rotational shaft 2 by interposing the supply/discharge passage 4, the pump-out passage 5, and the return passage 6.

The hydraulic oil of the supply/discharge passage 4 is pumped in to the hydraulic pump 10 and is pumped out to the pump-out passage 5. The hydraulic pump 10 assists the main hydraulic pump to drive the hydraulic actuator using the pumped-out hydraulic oil. The hydraulic pump 10 includes a cylinder block 11 connected to the rotational shaft 2, a plurality of pistons 13 housed in each of a plurality of cylinders 12 defined in the cylinder block 11, a cam plate 14 that reciprocates the piston 13 making sliding contact, and a port plate 15 where the end surface of the cylinder block 11 makes sliding contact.

The cylinder block 11 is formed in an approximately cylindrical shape and is rotated in synchronization with the rotational shaft 2. The cylinder block 11 is rotationally driven by the rotational shaft 2. The cylinder block 11 is provided with a plurality of cylinders 12 in parallel with the rotational shaft 2.

The cylinders 12 are arranged side by side in a ring shape with a constant interval on the same circumference centered at the rotational shaft 2 of the cylinder block 11. The piston 13 is inserted into each cylinder 12 so as to define a chamber 12*a* with the piston 13. The chamber 12*a* communicates with the port plate 15 through a communicating hole.

The piston 13 makes sliding contact with the cam plate 14 when the cylinder block 11 is rotated in synchronization with the rotational shaft 2. As a result, the piston 13 reciprocates inside the cylinder 12 depending on a tilt angle of the cam plate 14 to expand or contract the chamber 12*a*.

The cam plate 14 is provided such that the tilt angle can be controlled by a variable capacity actuator (not illustrated). The cam plate 14 can control the tilt from a zero angle state perpendicular to the rotational shaft 2 to the state illustrated in FIG. 2A. The tilt angle of the cam plate 14 is controlled by the variable capacity actuator in a stepless manner.

The port plate 15 is formed in a disc shape. A penetrating hole is formed in center of the port plate 15 where the rotational shaft 2 is inserted. The port plate 15 has a supply port 15*a* formed in a circular arc shape centered at the rotational shaft 2 to make communication between the supply/discharge passage 4 and the chamber 12*a*, and a pump-out port 15*b* similarly formed in a circular arc shape centered at the rotational shaft 2 to make communication between the pump-out passage 5 and the chamber 12*a*.

In the hydraulic pump 10, a region formed by making the piston 13 sliding contact with the cam plate 14 to expand the chamber 12*a* corresponds to a pump-in region, and a region formed by making the piston 13 sliding contact with the cam plate 14 to contract the chamber 12*a* corresponds to a pump-out region. The supply port 15*a* is formed to match the pump-in region, and the pump-out port 15_b_ is formed to match the pump-out region. As a result, as the cylinder block 11 is rotated, the hydraulic oil is pumped in to the chamber 12_a_ connected to the supply port 15_a_, and the hydraulic oil is pumped out from the chamber 12_a_ connected to the pump-out port 15_b_.

The hydraulic motor 20 is rotationally driven by the hydraulic oil discharged from the hydraulic actuator. The hydraulic motor 20 includes a cylinder block 21 connected to the rotational shaft 2, a plurality of pistons 23 housed in each of a plurality of cylinders 22 defined in the cylinder block 21, a cam plate 24 that reciprocates the piston 23 making sliding contact, and a port plate 25 where the end surface of the cylinder block 21 makes sliding contact. The cylinder block 21, the cylinder 22, the piston 23, and the cam plate 24 of the hydraulic motor 20 have the same configurations as those of the hydraulic pump 10 described above except for their sizes. Therefore, description will not be repeated here.

The port plate 25 is formed in a disc shape. A penetrating hole is formed in center of the port plate 25 where the rotational shaft 2 is inserted. The port plate 25 includes a supply port 25_a_ formed in a circular arc shape centered at the rotational shaft 2 to make communication between the return passage 6 and the chamber 22_a_, similarly formed in a circular arc shape centered at the rotational shaft 2, and a discharge port 25_b_ to make communication between the supply/discharge passage 4 and the chamber 22_a_.

In the hydraulic motor 20, a region formed by making the piston 23 sliding contact with the cam plate 24 to expand the chamber 22_a_ corresponds to a pump-in region, and a region formed by making the piston 23 sliding contact with the cam plate 24 to contract the chamber 22_a_ corresponds to a discharge region. The supply port 25_a_ is formed to match the pump-in region, and the discharge port 25_b_ is formed to match the discharge region. As a result, as the cylinder block 21 is rotated, the hydraulic oil is pumped in to the chamber 12_a_ connected to the supply port 25_a_, and the hydraulic oil is discharged from the chamber 12_a_ connected to the discharge port 25_b_.

The electric motor 30 can generate regenerative electric power by rotationally driving the hydraulic pump 10 and rotating the hydraulic motor 20. The electric power generated by the electric motor 30 is stored in an electric storage device (not illustrated). The electric motor 30 rotationally drives the hydraulic pump 10 using the regenerative power generated by rotating the hydraulic motor 20 and stored in the electric storage device.

Hereinafter, operations of the hydraulic pump motor 100 will be described.

First, description will be made for a case where the hydraulic pump 10 or the hydraulic motor 20 is solely actuated.

When the hydraulic pump motor 100 assists the main hydraulic pump to drive the hydraulic actuator, the electric motor 30 is rotated using the electric power stored in the electric storage device in advance. As the electric motor 30 is rotated, the rotational shaft 2 of the hydraulic pump motor 100 is rotationally driven.

In the hydraulic pump 10, a tilt angle of the cam plate 14 is switched to a predetermined value greater than zero using the variable capacity actuator. In the hydraulic pump 10, as the cylinder block 11 is rotated, the piston 13 reciprocates inside the cylinder 12. As the piston 13 reciprocates, the hydraulic oil from the reservoir is pumped in to the chamber 12_a_ through the supply port 15_a_ of the port plate 15. In addition, the hydraulic oil pumped out from the chamber 12_a_ is guided to the pump-out passage 5 through the pump-out port 15_b_ of the port plate 15.

As a result, the hydraulic oil pumped out from the hydraulic pump motor 100 is supplied for driving the hydraulic actuator to assist the main hydraulic pump to drive the hydraulic actuator.

In this case, the hydraulic motor 20 is maintained by the variable capacity actuator such that the tilt angle of the cam plate 24 is set to zero. Therefore, since the piston 23 does not reciprocate inside the cylinder 22, a displacement volume caused by the piston 23 becomes zero. Accordingly, the hydraulic motor 20 does not supply or discharge the hydraulic oil, but simply runs idle. Therefore, it is possible to suppress a driving loss of the hydraulic motor 20.

In this case, as illustrated in FIGS. 2A and 2B, the variable valve 7 is switched to maximize the fluid path area of the supply/discharge passage 4. As a result, since a pressure loss inside the supply/discharge passage 4 is reduced, it is possible to improve pump-in efficiency of the hydraulic pump 10.

Meanwhile, when electric power is regenerated by the hydraulic oil discharged from the hydraulic actuator, the hydraulic motor 20 switches the tilt angle of the cam plate 24 to a predetermined value greater than zero using the variable capacity actuator. In the hydraulic motor 20, the piston 23 reciprocates inside the cylinder 22 as the cylinder block 21 is rotated. As the piston 23 reciprocates, the pressurized hydraulic oil returning from the hydraulic actuator through the return passage 6 flows into the chamber 22_a_ through the supply port 25_a_ of the port plate 25. In addition, the piston 23 reciprocates inside the cylinder 22 to rotationally drive the cylinder block 21. The hydraulic oil flowing into the chamber 22_a_ is discharged to the supply/discharge passage 4 through the discharge passage 25_b_ of the port plate 25 and reflows to the reservoir.

The rotational shaft 2 is rotated in synchronization with the cylinder block 21 to transmit rotation of the rotational shaft 2 to a rotational shaft of the electric motor 30. As a result, the electric motor 30 can regenerate electric power and store the electric power in the electric storage device.

In this case, the hydraulic pump 10 is maintained by the variable capacity actuator such that the tilt angle of the cam plate 14 is set to zero. Therefore, since the piston 13 does not reciprocate inside the cylinder 12, a displacement volume caused by the piston 13 becomes zero. Accordingly, the hydraulic pump 10 does not supply or discharge the hydraulic oil, but runs idle. Therefore, it is possible to suppress a driving loss of the hydraulic pump 10.

Similarly, in this case, as illustrated in FIGS. 2A and 2B, the variable valve 7 is switched to maximize the fluid path area of the supply/discharge passage 4. As a result, since a pressure loss inside the supply/discharge passage 4 is reduced, it is possible to improve discharge efficiency of the hydraulic motor 20.

Next, description will be made for a case where the hydraulic pump 10 and the hydraulic motor 20 are simultaneously actuated.

When the hydraulic pump motor 100 assists the main hydraulic pump to supply the hydraulic oil to a plurality of hydraulic actuators, driving of one hydraulic actuator may be assisted while the hydraulic oil reflows from other hydraulic actuators. In this case, the hydraulic pump 10 and the hydraulic motor 20 are simultaneously actuated.

In the hydraulic pump 10, the tilt angle of the cam plate 14 is switched by the variable capacity actuator to a predetermined value greater than zero. As a result, the hydraulic oil pumped out from the hydraulic pump motor 100 is supplied for driving the hydraulic actuator to assist the main hydraulic pump to drive the hydraulic actuator.

In the hydraulic motor 20, the tilt angle of the cam plate 24 is switched by the variable capacity actuator to a predetermined value greater than zero. As a result, the piston 23 reciprocates inside the cylinder 22, and the cylinder block 21 is rotationally driven, so that the rotational shaft 2 rotated in synchronization with the cylinder block 21 is rotationally driven.

In this case, as the hydraulic motor 20 rotationally drives the rotational shaft 2, it is possible to reduce energy of the electric motor 30 necessary to drive the hydraulic pump 10. That is, the hydraulic motor 20 assists the electric motor 30 to drive the hydraulic pump 10. In this manner, when the regenerative energy from the hydraulic motor 20 is lower than the energy necessary to drive the hydraulic motor 10, the electric motor 30 is rotated using the electric power stored in the electric storage device in advance to rotationally drive the rotational shaft 2 in association with the hydraulic motor 20.

Meanwhile, when the regenerative energy from the hydraulic motor 20 is higher than the energy necessary to drive the hydraulic pump 10, the hydraulic motor 20 rotationally drives the rotational shaft 2 to drive the hydraulic pump 10, and the electric motor 30 is rotationally driven. As a result, the hydraulic pump 10 assists the main hydraulic pump to drive the hydraulic actuator, and the regenerative power generated by the electric motor 30 can be stored in the electric storage device.

Figure 3A:
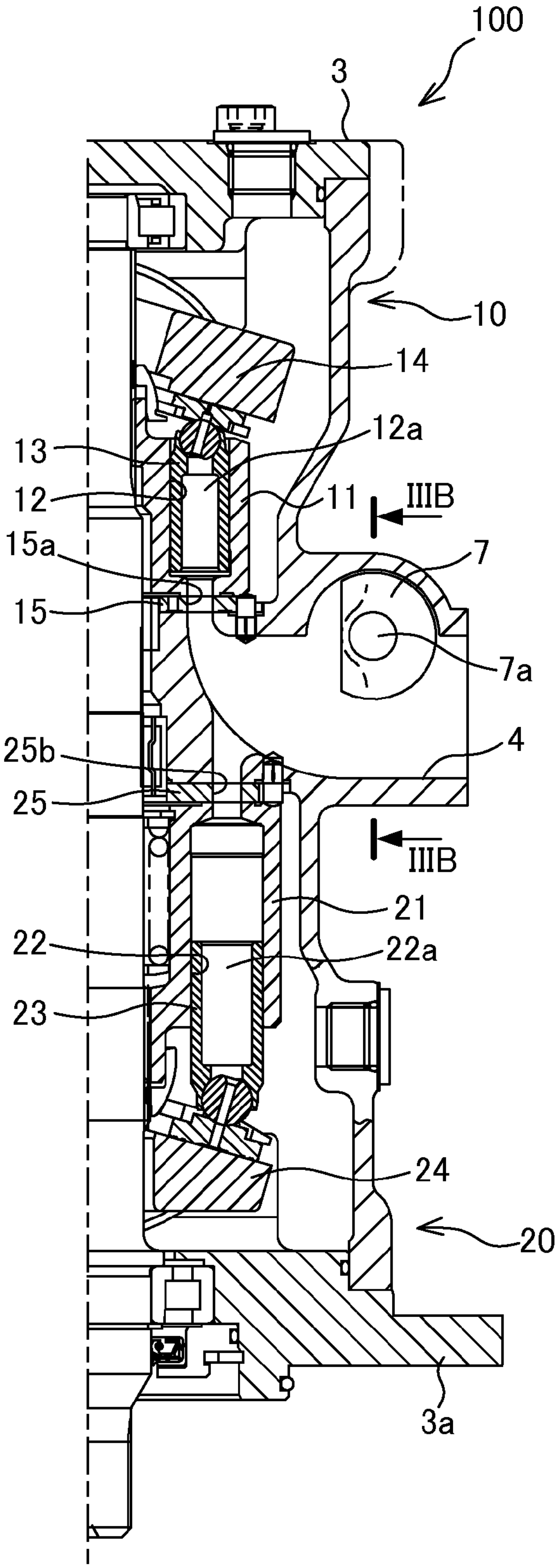
FIG. 3A is a diagram illustrating an effect of the variable valve when the fluid path area is minimized.
Figure 3B:
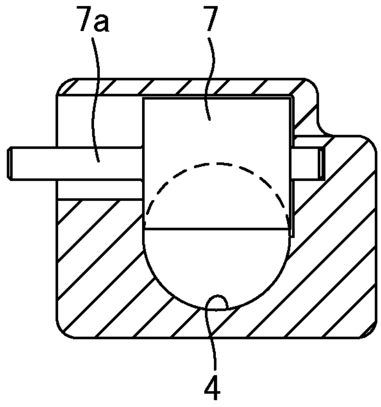
FIG. 3B is a cross-sectional view taken along a line IIIB-IIIB of FIG. 3A.

In this case, as illustrated in FIGS. 3A and 3B, the variable valve 7 is switched to reduce the fluid path area of the supply/discharge passage 4. As a result, it is possible to prevent the hydraulic oil of a pump-in capacity necessary in the hydraulic pump 10 from being discharged from the supply/discharge passage 4. Therefore, even when the hydraulic pump 10 and the hydraulic motor 20 are simultaneously actuated, it is possible to stably supply the hydraulic oil from the supply/discharge passage 4 to the hydraulic pump 10.

The hydraulic pump 10 is a variable capacity pump whose capacity changes depending on a tilt angle of the cam plate 14. For this reason, the variable valve 7 controls the fluid path area of the supply/discharge passage 4 depending on a change of the pump-in capacity of the hydraulic pump 10. In addition, when the hydraulic pump 10 is a fixed capacity pump, the variable valve 7 controls the fluid path area of the supply/discharge passage 4 depending on the rotation number of the hydraulic pump 10.

According to the first embodiment described above, it is possible to obtain the following effects.

When the hydraulic pump 10 and the hydraulic motor 20 are simultaneously actuated, the variable valve 7 reduces the fluid path area of the supply/discharge passage 4. Therefore, it is possible to prevent the hydraulic oil of the pump-in capacity necessary in the hydraulic pump 10 from being discharged from the supply/discharge passage 4. Accordingly, even when the hydraulic pump 10 and the hydraulic motor 20 are simultaneously actuated, it is possible to stably supply the hydraulic oil from the supply/discharge passage 4 to the hydraulic pump 10.

When the hydraulic pump 10 is solely actuated, the variable valve 7 maximizes the fluid path area of the supply/discharge passage 4. As a result, since a pressure loss in the supply/discharge passage 4 is reduced, it is possible to improve pump-in efficiency of the hydraulic pump 10. Similarly, even when the hydraulic motor 20 is solely actuated, the variable valve 7 maximizes the fluid path area of the supply/discharge passage 4. As a result, since a pressure loss in the supply/discharge passage 4 is reduced, it is possible to improve discharge efficiency of the hydraulic motor 20.

Second Embodiment

Figure 4A:
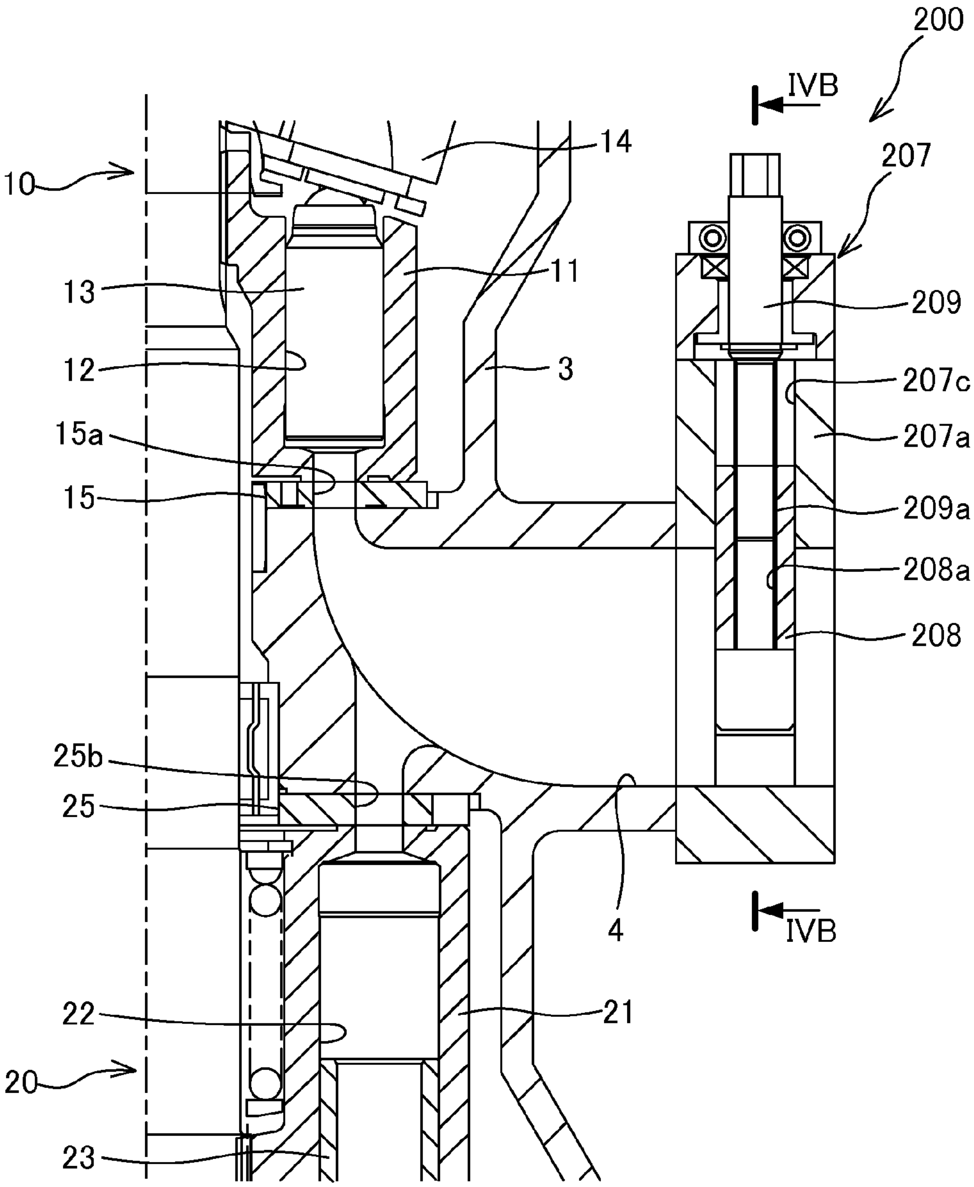
FIG. 4A is a front cross-sectional view illustrating a vicinity of a variable valve of a fluid pressure pump motor according to a second embodiment of the invention.
Figure 4B:
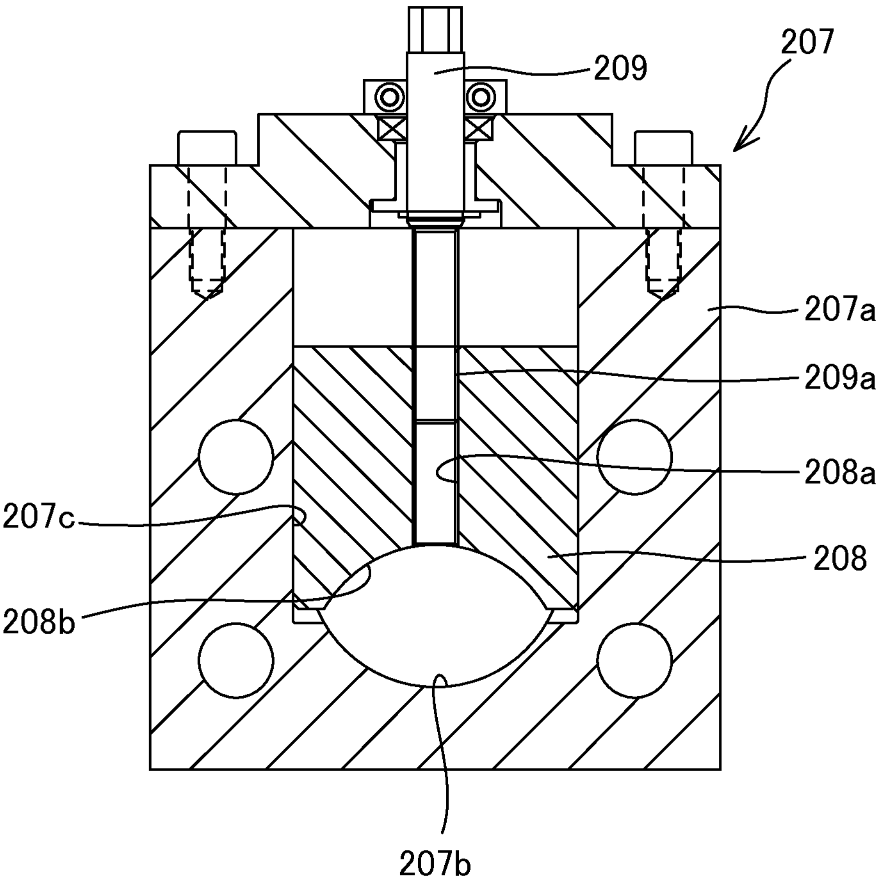
FIG. 4B is a cross-sectional view taken along a line IVB-IVB of FIG. 4A.

Hereinafter, a hydraulic pump motor 200 as a fluid pressure pump motor according to a second embodiment of the invention will be described with reference to FIGS. 4A and 4B. In each embodiment described below, like reference numerals denote like elements as in the first embodiment described above, and description thereof will not be repeated.

The second embodiment is different from the first embodiment in that a gate valve is employed as the variable valve 207.

The hydraulic pump motor 200 includes a hydraulic pump 10 that supplies hydraulic oil to a hydraulic actuator, a hydraulic motor 20 rotationally driven by the hydraulic oil reflowing from the hydraulic actuator, an electric motor 30 arranged side by side in series with the hydraulic pump 10 and the hydraulic motor 20, a casing 3 that houses the hydraulic pump 10 and the hydraulic motor 20, and a variable valve 207 provided in the casing 3 and capable of controlling a fluid path area of the supply/discharge passage 4.

The variable valve 207 is a gate valve including a casing 207*a*, a gate 208 movable along a radial direction of the supply/discharge passage 4, and a shaft 209 screwed to the gate 208 to advance or retreat the gate 208 with respect to the supply/discharge passage 4 as it rotates.

The casing 207*a* is formed in a rectangular frame shape and is installed in the casing 3. The casing 207*a* includes a penetrating hole 207*b* communicating with the supply/discharge passage 4 of the casing 3 and a guide portion 207*c* that slidably guides the gate 208. The penetrating hole 207*b* is included in a part of the supply/discharge passage 4.

The gate 208 is a block capable of translation along the guide portion 207*c*. The gate 208 includes a female screw 208*a* screwed to a male screw 209*a* of the shaft 209 and a circular arc portion 208*b* having the same shape as a shape of the wall surface of the supply/discharge passage 4 together with the penetrating hole 207*b* when the area of the supply/discharge passage 4 is maximized.

The gate 208 is buried in a wall surface of the supply/discharge passage 4 when the fluid path area of the supply/discharge passage 4 is maximized. The gate 208 reduces the fluid path area of the supply/discharge passage 4 as it enters the inside of the supply/discharge passage 4.

The shaft 209 is installed in the casing 207*a* rotatably around the central axis. The shaft 209 is rotationally driven by a rotational actuator (not illustrated). The shaft 209 has a male screw 209*a* screwed to the female screw 208*a* of the gate 208.

As the shaft 209 is rotated, the male screw 209*a* and the female screw 208*a* are screwed together so that the gate 208 advances or retreats with respect to the supply/discharge passage 4. As a result, it is possible to control the fluid path area of the supply/discharge passage 4 by rotationally driving the shaft 209 to advance or retreat the gate 208.

The variable valve 207 maximizes the fluid path area of the supply/discharge passage 4 when only one of the hydraulic pump 10 and the hydraulic motor 20 is actuated. The variable valve 207 reduces the fluid path area of the supply/discharge passage 4 when the hydraulic pump 10 and the hydraulic motor 20 are simultaneously actuated. In this manner, the variable valve 207 reduces the fluid path area of the supply/discharge passage 4 for simultaneously actuating the hydraulic pump 10 and the hydraulic motor 20 to be smaller than the fluid path area for actuating only one of the hydraulic pump 10 and the hydraulic motor 20.

Similarly, according to the second embodiment described above, the variable valve 207 reduces the fluid path area of the supply/discharge passage 4 when the hydraulic pump 10 and the hydraulic motor 20 are simultaneously actuated. Therefore, it is possible to prevent the hydraulic oil of the pump-in capacity necessary in the hydraulic pump 10 from being discharged from the supply/discharge passage 4. Therefore, even when the hydraulic pump 10 and the hydraulic motor 20 are simultaneously actuated, it is possible to stably supply the hydraulic oil from the supply/discharge passage 4 to the hydraulic pump 10.

When the hydraulic pump 10 is solely actuated, the variable valve 207 maximizes the fluid path area of the supply/discharge passage 4. As a result, since a pressure loss in the supply/discharge passage 4 is reduced, it is possible to improve pump-in efficiency of the hydraulic pump 10. Similarly, when the hydraulic motor 20 is solely actuated, the variable valve 207 maximizes the fluid path area of the supply/discharge passage 4. As a result, since a pressure loss in the supply/discharge passage 4 is reduced, it is possible to improve discharge efficiency of the hydraulic motor 20.

Third Embodiment

Figure 5A:
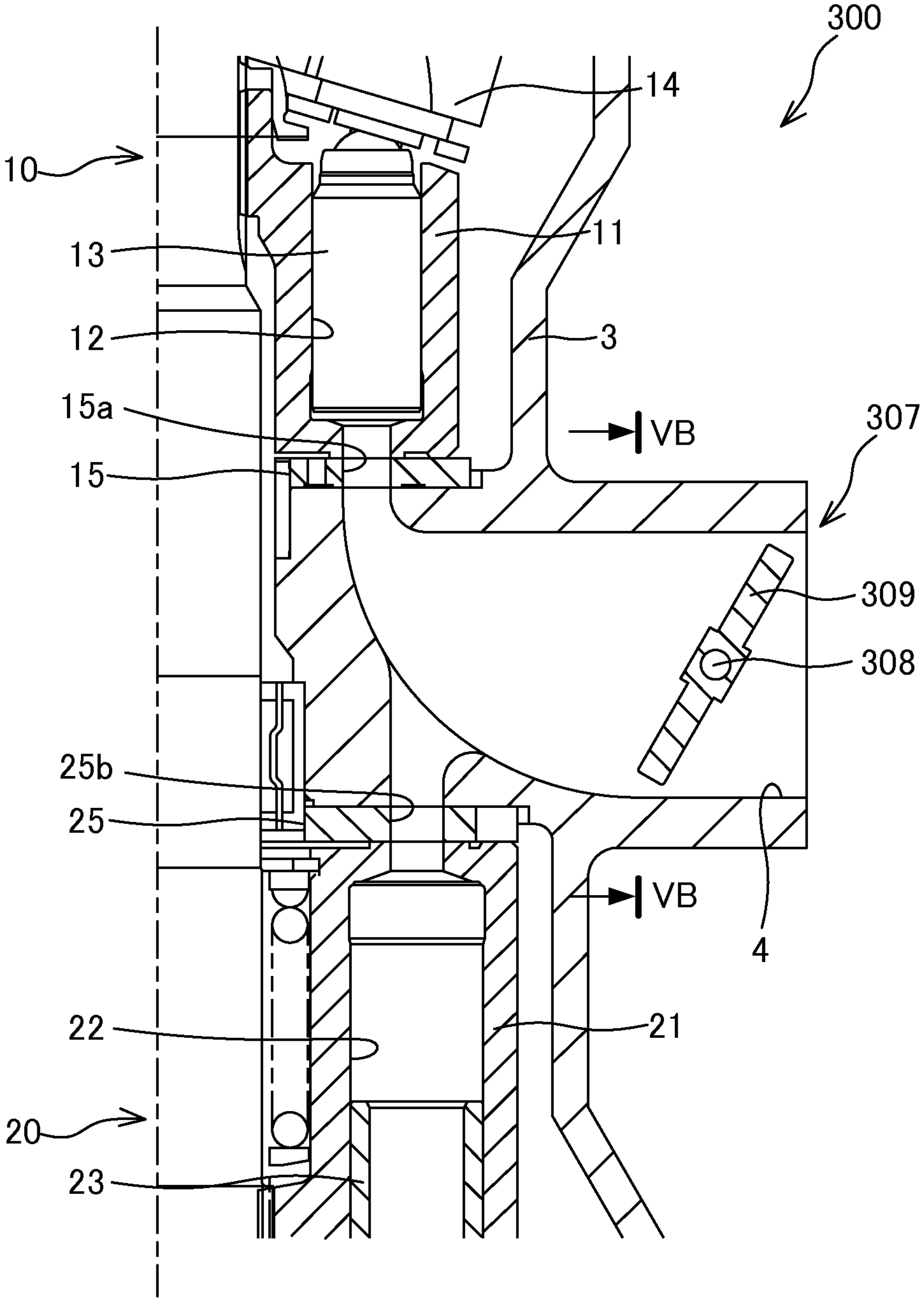
FIG. 5A is a front cross-sectional view illustrating a vicinity of a variable valve of a fluid pressure pump motor according to a third embodiment of the invention.
Figure 5B:
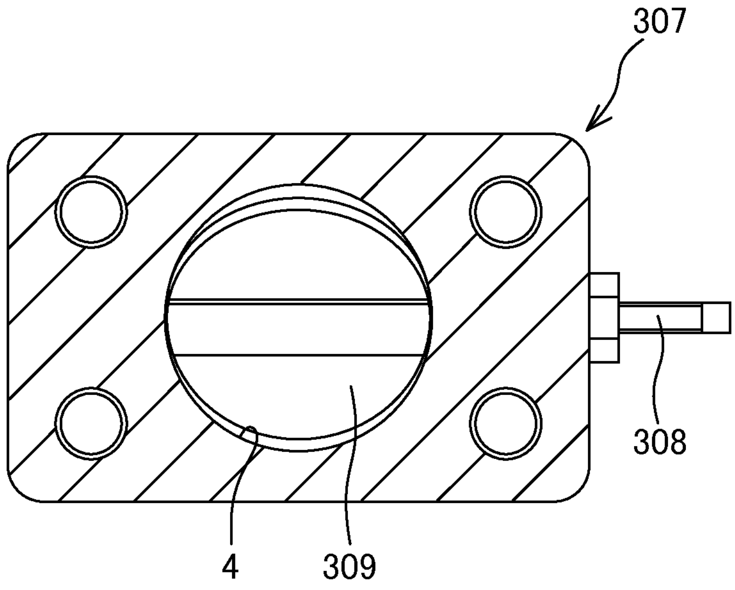
FIG. 5B is a cross-sectional view taken along a line VB-VB of FIG. 5A.

Hereinafter, a hydraulic pump motor 300 as a fluid pressure pump motor according to a third embodiment of the invention will be described with reference to FIGS. 5A and 5B.

The third embodiment is different from the first and second embodiments described above in that a butterfly valve is employed as the variable valve 307.

The hydraulic pump motor 300 includes a hydraulic pump 10 that supplies hydraulic oil to a hydraulic actuator, a hydraulic motor 20 rotationally driven by hydraulic oil reflowing from the hydraulic actuator, an electric motor 30 arranged side by side in series with the hydraulic pump 10 and the hydraulic motor 20, a casing 3 that houses the hydraulic pump 10 and the hydraulic motor 20, and a variable valve 307 provided in the casing 3 and capable of controlling the fluid path area of the supply/discharge passage 4.

The variable valve 307 is a butterfly valve that is provided in the supply/discharge passage 4 and has a disc-like valve main body 309 pivoted with respect to a valve stem 308.

The valve stem 308 is installed in the casing 3 pivotably with respect to a central axis. The valve stem 308 is inserted to pass through the center of the supply/discharge passage 4. The valve stem 308 is rotationally driven by a rotational actuator (not illustrated).

The valve main body 309 is formed to have a diameter approximately equal to an inner diameter of the supply/discharge passage 4. The valve main body 309 is pivoted in synchronization with the valve stem 308. The valve main body 309 is pivoted as the valve stem 308 is rotationally driven by the actuator. The fluid path area is maximized when the valve main body 309 is in parallel to a flow direction of the hydraulic oil in the supply/discharge passage 4. Meanwhile, the fluid path area is reduced to approximately a half when the valve main body 309 is pivoted by approximately 30° from the state parallel to the flow direction of the hydraulic oil in the supply/discharge passage 4.

In this manner, the variable valve 307 is formed such that the hydraulic oil flows through the supply/discharge passage 4 even when the fluid path area of the supply/discharge passage 4 is minimized. Therefore, since the supply/discharge passage 4 is not completely blocked, it is possible to guide extra hydraulic oil to the reservoir when the hydraulic oil discharged from the hydraulic motor 20 is more than the hydraulic oil pumped in to the hydraulic pump 10.

The variable valve 307 maximizes the fluid path area of the supply/discharge passage 4 when only one of the hydraulic pump 10 and the hydraulic motor 20 is actuated. The variable valve 307 reduces the fluid path area of the supply/discharge passage 4 when the hydraulic pump 10 and the hydraulic motor 20 are simultaneously actuated. In this manner, the variable valve 307 reduces the fluid path area of the supply/discharge passage 4 for simultaneously actuating the hydraulic pump 10 and the hydraulic motor 20 to be smaller than the fluid path area for actuating only one of the hydraulic pump 10 and the hydraulic motor 20.

Similarly, according to the third embodiment described above, the variable valve 307 reduces the fluid path area of the supply/discharge passage 4 when the hydraulic pump 10 and the hydraulic motor 20 are simultaneously actuated. Therefore, it is possible to prevent the hydraulic oil of the pump-in capacity necessary in the hydraulic pump 10 from being discharged from the supply/discharge passage 4. Accordingly, it is possible to stably supply the hydraulic oil from the supply/discharge passage 4 to the hydraulic pump 10 even when the hydraulic pump 10 and the hydraulic motor 20 are simultaneously actuated.

When the hydraulic pump 10 is solely actuated, the variable valve 307 maximizes the fluid path area of the supply/discharge passage 4. As a result, since a pressure loss in the supply/discharge passage 4 is reduced, it is possible to improve pump-in efficiency of the hydraulic pump 10. Similarly, when the hydraulic motor 20 is solely actuated, the variable valve 307 maximizes the fluid path area of the supply/discharge passage 4. As a result, since the pressure loss in the supply/discharge passage 4 is reduced, it is possible to improve discharge efficiency of the hydraulic motor 20.

Fourth Embodiment

Figure 6A:
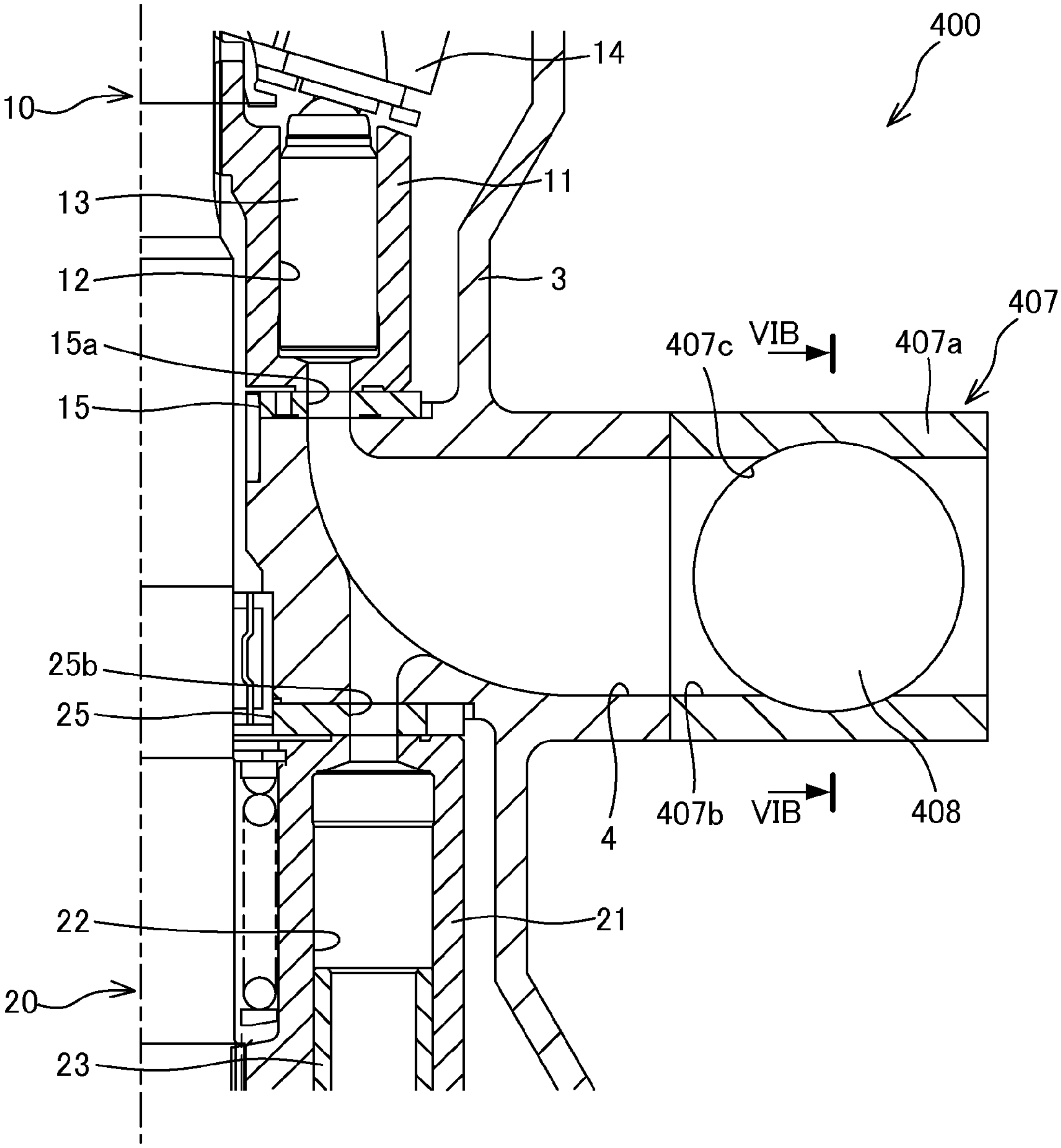
FIG. 6A is a front cross-sectional view illustrating a vicinity of a variable valve of a fluid pressure pump motor according to a fourth embodiment of the invention.
Figure 6B:
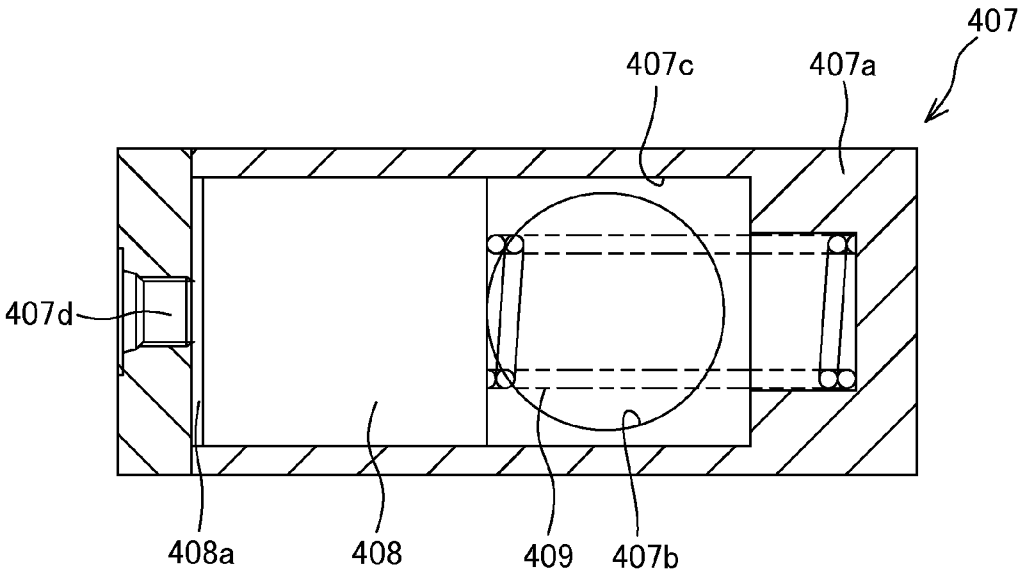
FIG. 6B is a cross-sectional view taken along a line VIB-VIB of FIG. 6A.

Hereinafter, a hydraulic pump motor 400 as a fluid pressure pump motor according to a fourth embodiment of the invention will be described with reference to FIGS. 6A and 6B.

The fourth embodiment is different from the first to third embodiments described above in that a spool valve is employed as the variable valve 407.

The hydraulic pump motor 400 includes a hydraulic pump 10 that supplies hydraulic oil to a hydraulic actuator, a hydraulic motor 20 rotationally driven by the hydraulic oil reflowing from the hydraulic actuator, an electric motor 30 arranged side by side in series with the hydraulic pump 10 and the hydraulic motor 20, a casing 3 that houses the hydraulic pump 10 and the hydraulic motor 20, and a variable valve 407 provided in the casing 3 and capable of controlling the fluid path area of the supply/discharge passage 4.

The variable valve 407 is a spool valve including a casing 407*a*, a spool 408 movable along a radial direction of the supply/discharge passage 4, a back pressure chamber 408*a* that biases the spool 408 toward the inside of the supply/discharge passage 4 by virtue of the supplied hydraulic oil, and a return spring 409 that biases the spool 408 toward the back pressure chamber 408*a*.

The casing 407*a* is formed in an approximately rectangular shape and is installed in the casing 3. The casing 407*a* includes a penetrating hole 407*b* communicating with the supply/discharge passage 4 of the casing 3 and a spool cavity 407*c* that receives the spool 408 slidably in an axial direction. The penetrating hole 407*b* is included in a part of the supply/discharge passage 4.

The spool 408 is a cylinder that can advance or retreat inside the spool cavity 407*c*. The spool 408 maximizes the fluid path area of the supply/discharge passage 4 while the spool 408 is buried in a wall surface of the supply/discharge passage 4.

The back pressure chamber 408*a* is defined in the spool cavity 407*c* as the spool 408 is received. The back pressure chamber 408*a* communicates with an external hydraulic pressure source through the communicating hole 407*d*. The back pressure chamber 408*a* is supplied with the hydraulic oil from the external hydraulic pressure source. By virtue of the pressure of the hydraulic oil supplied to the back pressure chamber 408*a*, the spool 408 is biased to reduce the opening area of the penetrating hole 407*b*.

The return spring 409 is housed in the spool cavity 407*c*. The return spring 409 is provided to face the back pressure chamber 408*a* by interposing the spool 408. The return spring 409 forces back the spool 408 toward the back pressure chamber 408*a* when the biasing force exceeds the pressure of the hydraulic oil in the back pressure chamber 408*a*.

In this manner, the spool 408 moves along an axial direction inside the spool cavity 407*c* depending on a balance between the pressure of the hydraulic oil in the back pressure chamber 408*a* and the biasing force of the return spring 409 by changing the pressure of the hydraulic oil supplied to the back pressure chamber 408*a*. As a result, the variable valve 407 can control the opening area of the supply/discharge passage 4.

The variable valve 407 maximizes the fluid path area of the supply/discharge passage 4 when only one of the hydraulic pump 10 and hydraulic motor 20 is actuated. The variable valve 407 reduces the fluid path area of the supply/discharge passage 4 when the hydraulic pump 10 and the hydraulic motor 20 are simultaneously actuated. In this manner, the variable valve 407 reduces the fluid path area of the supply/discharge passage 4 for simultaneously actuating the hydraulic pump 10 and the hydraulic motor 20 to be smaller than the fluid path area for actuating only one of the hydraulic pump 10 and the hydraulic motor 20.

Similarly, according to the fourth embodiment described above, the variable valve 407 reduces the fluid path area of the supply/discharge passage 4 when the hydraulic pump 10 and the hydraulic motor 20 are simultaneously actuated. Therefore, it is possible to prevent the hydraulic oil of the pump-in capacity necessary in the hydraulic pump 10 from being discharged from the supply/discharge passage 4. Accordingly, it is possible to stably supply the hydraulic oil from the supply/discharge passage 4 to the hydraulic pump 10 even when the hydraulic pump 10 and the hydraulic motor 20 are simultaneously actuated.

The variable valve 407 maximizes the fluid path area of the supply/discharge passage 4 when the hydraulic pump 10 is solely actuated. As a result, since a pressure loss in the supply/discharge passage 4 is reduced, it is possible to improve pump-in efficiency of the hydraulic pump 10. Similarly, the variable valve 407 maximizes the fluid path area of the supply/discharge passage 4 when the hydraulic motor 20 is solely actuated. As a result, since a pressure loss in the supply/discharge passage 4 is reduced, it is possible to improve discharge efficiency of the hydraulic motor 20.

Embodiments of this invention were described above, but the above embodiments are merely examples of applications of this invention, and the technical scope of this invention is not limited to the specific constitutions of the above embodiments.

For example, the hydraulic pump motor 100, 200, 300, or 400 assists the main hydraulic pump to drive the hydraulic actuator. Alternatively, the hydraulic actuator may be driven only using the hydraulic pump motor 100, 200, 300, or 400.

A cam plate type piston pump motor is employed as both the hydraulic pump 10 and the hydraulic motor 20. Alternatively, other types of pump motors may also be employed.

The invention claimed is:

1. A fluid pressure pump motor comprising:

a fluid pressure pump that is configured to supply a hydraulic fluid to a fluid pressure actuator;

a fluid pressure motor that is configured to be rotationally driven by the hydraulic fluid reflowing from the fluid pressure actuator;

a supply/discharge passage where both a hydraulic fluid pumped in to the fluid pressure pump and a hydraulic fluid discharged from the fluid pressure motor flow; and a variable valve provided in the supply/discharge passage and capable of controlling a fluid path area of the supply/discharge passage, wherein the variable valve reduces the fluid path area of the supply/discharge passage for simultaneously actuating the fluid pressure pump and the fluid pressure motor to be smaller than the fluid path area for actuating only one of the fluid pressure pump and the fluid pressure motor.

2. The fluid pressure pump motor according to claim 1, further comprising an electric motor that is configured to generate regenerative electric power by rotating the fluid pressure motor and rotationally drive the fluid pressure pump using regenerative electric power.

3. The fluid pressure pump motor according to claim 1, wherein the fluid pressure pump is a variable capacity pump, and the variable valve is configured to control the fluid path area of the supply/discharge passage depending on a pump-in capacity of the fluid pressure pump.

4. The fluid pressure pump motor according to claim 1, wherein the fluid pressure pump is a fixed capacity pump, and the variable valve is configured to control the fluid path area of the supply/discharge passage depending on a rotational number of the fluid pressure pump.

5. The fluid pressure pump motor according to claim 1, wherein the fluid pressure pump motor is applied to a hybrid type construction machine in which the fluid pressure actuator is driven by a hydraulic fluid pumped out from a main fluid pressure pump driven by a motor, the fluid pressure motor is configured to be rotationally driven by a hydraulic fluid discharged from the fluid pressure actuator, and the fluid pressure pump is configured to assist the main fluid pressure pump to drive the fluid pressure actuator using the pumped-out hydraulic fluid.

6. The fluid pressure pump motor according to claim 1, wherein the variable valve is a rotary valve which is buried in a wall surface of the supply/discharge passage to maximize the fluid path area of the supply/discharge passage, and the variable valve protrudes toward an inner side of the supply/discharge passage and reduce the fluid path area of the supply/discharge passage as the variable valve is pivoted with respect to a rotational shaft.

7. The fluid pressure pump motor according to claim 1, wherein the variable valve is a gate valve having:

a gate buried in a wall surface of the supply/discharge passage to maximize the fluid path area of the supply/discharge passage and movable along a radial direction of the supply/discharge passage, and a shaft screwed to the gate to advance or retreat the gate with respect to the supply/discharge passage as the shaft is rotated.

8. The fluid pressure pump motor according to claim 1, wherein the variable valve is a butterfly valve provided in the supply/discharge passage and pivoted with respect to a valve stem to control the fluid path area of the supply/discharge passage.

9. The fluid pressure pump motor according to claim 1, wherein the variable valve is a spool valve having:

a spool buried in a wall surface of the supply/discharge passage to maximize the fluid path area of the supply/discharge passage and movable along a radial direction of the supply/discharge passage;

a back pressure chamber that biases the spool toward an inner side of the supply/discharge passage by virtue of the supplied hydraulic oil; and a return spring that biases the spool toward the back pressure chamber.

* * * * *